(12) United States Patent
Poola et al.

(10) Patent No.: US 9,525,486 B2
(45) Date of Patent: Dec. 20, 2016

(54) VISIBLE LIGHT COMMUNICATIONS PERSONAL AREA NETWORK CONTROLLER AND ACCESS POINT SYSTEMS AND METHODS

(71) Applicant: MOTOROLA SOLUTIONS, INC., Schaumburg, IL (US)

(72) Inventors: Jeelan Poola, Bangalore (IN); Somesh Agrawal, Karnataka (IN); Prasad K, Karnataka (IN); Sundaresan Sundaram, Karnataka (IN)

(73) Assignee: Extreme Networks, Inc., San Jose, CA (US)

( * ) Notice: Subject to any disclaimer, the term of this patent is extended or adjusted under 35 U.S.C. 154(b) by 16 days.

(21) Appl. No.: 14/647,273

(22) PCT Filed: Nov. 18, 2013

(86) PCT No.: PCT/US2013/070582
§ 371 (c)(1),
(2) Date: May 26, 2015

(87) PCT Pub. No.: WO2014/085128
PCT Pub. Date: Jun. 5, 2014

(65) Prior Publication Data
US 2015/0318922 A1    Nov. 5, 2015

(30) Foreign Application Priority Data
Nov. 27, 2012 (IN) .......................... 4939/CHE/2012

(51) Int. Cl.
*H04B 10/00* (2013.01)
*H04B 10/116* (2013.01)
(Continued)

(52) U.S. Cl.
CPC ......... *H04B 10/116* (2013.01); *H04Q 11/0062* (2013.01); *H04W 4/008* (2013.01); *H04Q 2011/0064* (2013.01); *H04W 88/08* (2013.01)

(58) Field of Classification Search
CPC .................................................. H04B 10/116
See application file for complete search history.

(56) References Cited

U.S. PATENT DOCUMENTS

2009/0310971 A1* 12/2009 Kim ................... H04B 10/1149
                                                      398/103
2010/0209105 A1* 8/2010 Shin .................. H04B 10/1149
                                                      398/58

(Continued)

OTHER PUBLICATIONS

International Search Report and Written Opinion for International Patent Application No. PCT/US2013/070582 mailed Mar. 24, 2014.

*Primary Examiner* — Danny Leung
(74) *Attorney, Agent, or Firm* — Ropes & Gray LLP (57) ABSTRACT

A network, a Visible Light Communications (VLC) controller, and a method relate to a network architecture splitting frame processing functionality between Light Fidelity (LiFi) Access Points (APs) and a VLC controller or virtualized controller. In such configurations, the LiFi APs are so-called thin devices that may be widely deployed through an infrastructure to concurrently provide illumination and network access via VLC protocols such as IEEE 802.15.7 or variants thereof.

20 Claims, 5 Drawing Sheets

(51) Int. Cl.
    *H04Q 11/00*    (2006.01)
    *H04W 4/00*     (2009.01)
    *H04W 88/08*    (2009.01)

(56) References Cited

U.S. PATENT DOCUMENTS

| | | | |
|---|---|---|---|
| 2011/0044218 A1* | 2/2011 | Kaur | H04W 72/1215 370/310 |
| 2011/0064405 A1* | 3/2011 | Rajagopal | H04B 10/114 398/43 |
| 2011/0087879 A1* | 4/2011 | Chand | H04K 3/25 713/153 |
| 2011/0105134 A1* | 5/2011 | Kim | H04W 72/048 455/450 |
| 2015/0288427 A1* | 10/2015 | Wang | H04W 72/1273 370/329 |
| 2015/0318922 A1* | 11/2015 | Poola | H04B 10/116 398/45 |

* cited by examiner

VISIBLE LIGHT COMMUNICATIONS PERSONAL AREA NETWORK CONTROLLER AND ACCESS POINT SYSTEMS AND METHODS

FIELD OF THE DISCLOSURE

The present disclosure relates generally to networking systems and methods and more particularly to Visible Light Communications (VLC) Personal Area Network (VPAN) controller and Access Point (AP) systems and methods.

BACKGROUND

With the explosion of smart phones, tablets, laptops, and other handheld, mobile devices both in enterprise (e.g., bring your own device or BYOD) and guest account scenarios, there is an ever increasing demand for wireless bandwidth. Conventionally, WLAN (also referred to as Wireless Fidelity (WiFi)) is a primary means of connectivity for such devices. WLAN is generally defined in IEEE 802.11 and variants thereof. Increasingly, WLANs are getting choked as demand grows exponentially with BYOD and the like. Deploying more and more WiFi/WLAN Access Points (APs) may not be a right solution in all cases as it may be either cost prohibitive or may increase chances of interference in limited spectrum or both in some cases. In addition to WLAN, such devices can utilize wireless service provider connectivity such as 3G, 4G Long Term Evolution (LTE), etc. Disadvantageously relative to WLAN, wireless service provider connectivity over 3G, 4G LTE, etc. is more costly and includes lower bandwidth. Accordingly, there is a need for systems and methods to provide network connectivity as the adoption of mobile devices and other devices continues.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, Visible Light Communications (VLC) Personal Area Network (VPAN) controller and Access Point (AP) systems and methods. In an exemplary embodiment, a network includes at least one visible light access point communicatively coupled to a device via a light connection; a controller communicatively coupled to the at least one visible light access point and an external network; the at least one visible light access point is configured to perform a first set of media access control functions; and the controller is configured to perform a second set of media access control functions, wherein the controller and the at least one visible light access point cooperatively perform the first set of media access control functions and the second set of media access control functions associated with frames between the device.

In another exemplary embodiment, a controller includes a network interface communicatively coupled to a Visible Light Communications (VLC) access point and a network; a processor; and memory storing instructions that, when executed, cause the processor to: receive a first partially processed data frame from the VLC access point, wherein the first partially processed data frame is directed from a device to the network, and wherein the first partially processed data frame has been processed according to a first set of media access control functions by the VLC access point; perform a second set of media access control functions on the first partially processed data frame, wherein the controller and the at least one visible light access point cooperatively perform the first set of media access control functions and the second set of media access control functions associated with frames between the device; partially process a second data frame according to the second set of media access control functions, wherein the second data frame is directed from the network to the device; and transmit the second partially processed data frame to the VLC access point for subsequent processing of the second partially processed data according to the first set of media access control functions by the VLC access point.

In yet another exemplary embodiment, a method includes receiving a first data frame at a Visible Light Communications (VLC) access point directed from a device to a network; performing a first set of media access control functions on the first data frame in the VLC access point to provide a first partially processed data frame; forwarding the first partially processed data frame to a controller; performing a second set of media access control function on the first partially processed data frame to provide a first fully processed data frame; forwarding the first fully processed data frame to the network; receiving a second data frame at the controller directed from the network to the device; performing the second set of media access control functions on the second data frame in the controller to provide a second partially processed data frame; forwarding the second partially processed data frame to the VLC access point; performing the first set of media access control function on the second partially processed data frame to provide a second fully processed data frame; and forwarding the second fully processed data frame to the device.

Figure 1:
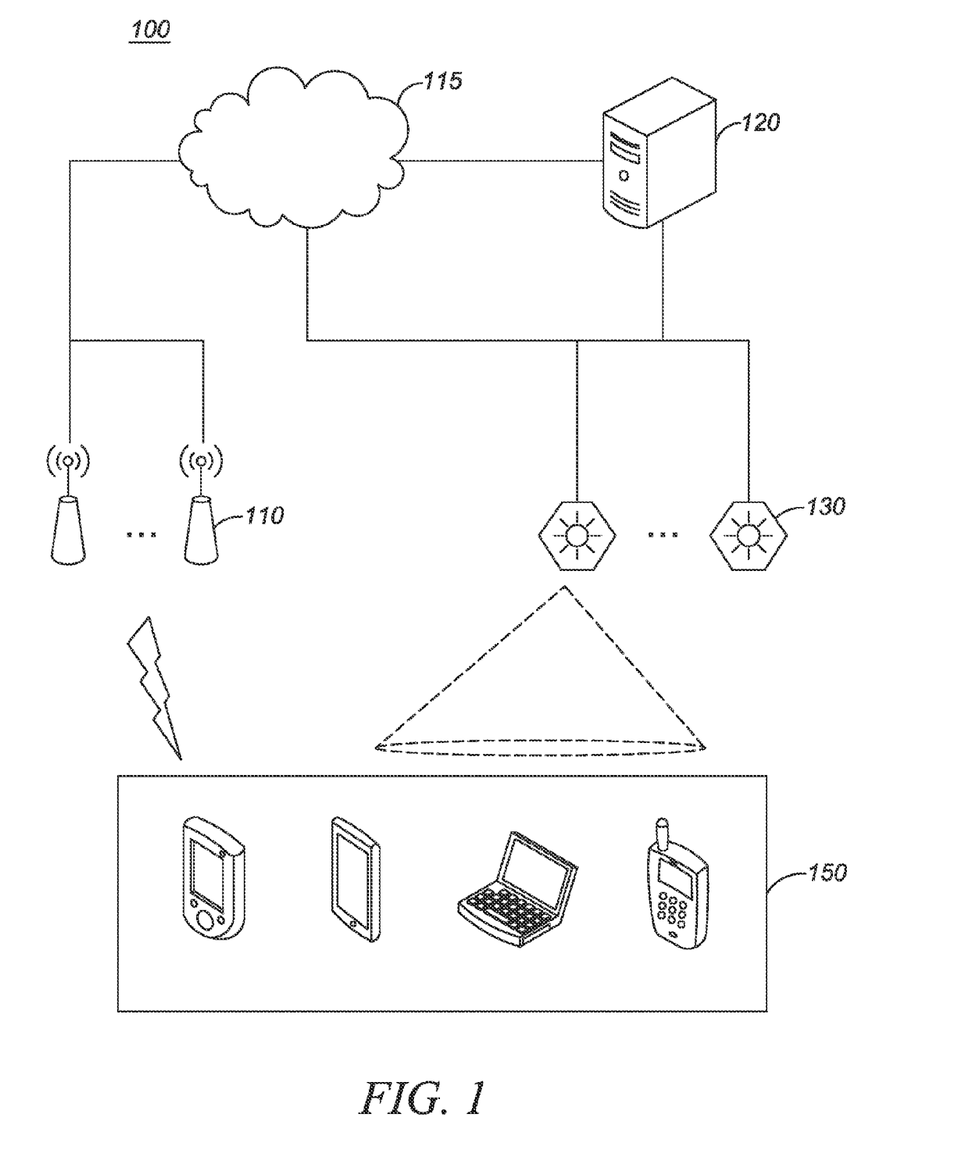
FIG. 1 is a network diagram illustrates an exemplary in accordance with some embodiments.

Referring to FIG. 1, in an exemplary embodiment, a network diagram illustrates an exemplary network 100. The network 100 includes one or more WLAN/WiFi access points (APs) 110 which may be communicatively coupled to a network 115. The network 100 further includes a Visible Light Communication (VLC) controller 120 with one or more Visible Light Communication (VLC) devices which may be referred to as Light Fidelity (LiFi) access points (APs) 130 communicatively coupled thereto. Additionally, the APs 130 can be communicatively coupled to the network 115 as can the VLC controller 120. In another exemplary embodiment, the APs 110, 130 can be communicatively coupled to one another without the intervening controller 120. In yet another exemplary embodiment, the APs 110, 130 can be communicatively coupled to one another both with and without the intervening controller 120. In still yet another exemplary embodiment, one of the APs 110, 130 can be a so-called virtualized controller performing functionality of the controller 120 within the AP 110, 130 and with other APs 110, 130 being communicatively coupled to the virtualized controller. Note, the APs 110, 130 and the controller 120 can be communicatively coupled to one another via various wired and/or wireless networks. As is described herein, the network 100 is presented to describe the VLC controller and AP systems and methods.

The network 100 further includes one or more devices 150 communicatively coupled to the APs 110, the APs 130, or both. Specifically, the devices 150 can include, without limitation, smart phones, tablets, netbooks, ultrabooks, laptops, personal digital assistants, desktops, or any other computing device with both WiFi and LiFi capability. The devices 150 can be stationary and/or mobile and use the APs 110, 130 for network connectivity. Note, within the context of the network 100, it is expected that the devices 150 can be both stationary and mobile at different times. For example, a tablet, ultrabook, netbook, etc. can be stationary when a user is working at a desk, and the same device could be mobile when the user is in transit or in a different area (e.g., conference room). Specifically, the APs 110, 130 can provide connectivity for the devices 150 to access the network 115, the Internet, Local Area Networks (LAN), Wide Area Networks (WAN), Virtual Private Networks (VPN), and the like. The devices 150 each include both a wireless interface supporting WLAN/WiFi connectivity and a light interface support VLC/LiFi connectivity. In an exemplary embodiment, the network 115 can include the Internet along with other LANs and the like.

In an exemplary embodiment, the APs 110 can utilize IEEE 802.11 or variants thereof. IEEE 802.11 is a well-known and widely deployed WLAN standard that operates in the 2.4, 3.6 and 5 GHz frequency bands and provides shared wireless access with data rates up to 11 Mb/s (IEEE 802.11b), 54 Mbs/s (IEEE 802.11g), 150 Mb/s (IEEE 802.11n), and the like. Due to the widespread adoption, unregulated frequency bands and low cost, IEEE 802.11 has become the technology of choice for providing high-speed network access for smart phones, tablets, etc.

Visible Light Communications (as being defined in IEEE 802.15.7 WPAN Task Group 7 (TG7) Visible Light Communications) is a Wireless Personal Area Network (WPAN) standard using visible light communications and is commonly known as Visible Light Communications, in short VLC or LiFi. Specifically, a specification includes IEEE 802.15.7 "Short-Range Wireless Optical Communication Using Visible Light," Sep. 6, 2011, the contents of which are incorporated by reference herein. VLC can use visible light between frequencies of 400 THz (780 nm) and 800 THz (375 nm) for communicating to the devices 150 while the visible light optionally concurrently provides illumination in an area. Note, data modulation on the visible light is not perceived by and harmless to human eyes. In an exemplary embodiment, the APs 130 can use Light Emitting Diodes (LEDs) for speeds in the hundreds of Mb/s range to the devices 150. Advantageously, the APs 130 operate in different frequency ranges from the APs 110, i.e. visible light versus radio waves, providing an opportunity for offloading congested WLAN networks as well as providing high-speed, wireless, localized network access.

Compared to WLAN/WiFi, VLC/LiFi is expected to have more bandwidth available in a more localized manner. For example, WLAN/WiFi is shared wireless access and the wireless signals often propagate through walls or other physical barriers. VLC/LiFi is localized, shared light access and will not propagate through walls or other physical barriers. Further, VLC/LiFi will support larger bandwidths than WLAN/WiFi as there is more frequency spectrum available for transmissions in a more localized manner.

Figure 2:
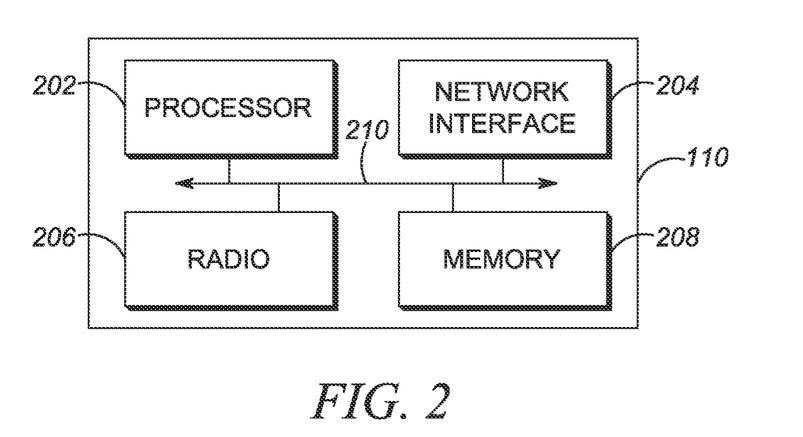
FIG. 2 is a block diagram of an implementation of a WLAN/WiFi AP for the network of FIG. 1 in accordance with some embodiments.
Figure 3:
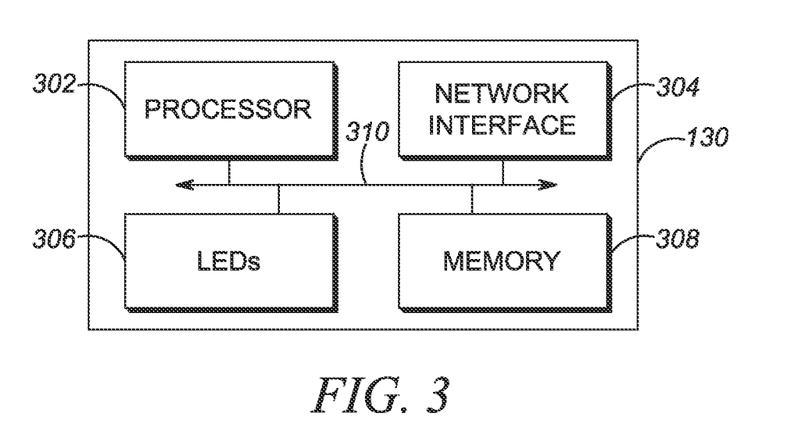
FIG. 3 is a block diagram of an implementation of a Visible Light Communications (VLC)/Light Fidelity (LiFi) AP for the network of FIG. 1 in accordance with some embodiments.

Referring to FIGS. 2 and 3, in an exemplary embodiment, block diagram illustrate implementations of the AP 110 and the AP 130. The APs 110, 130 can include a processor 202, 302, a network interface 204, 304, a radio 206 for the AP 110, LEDs 306 for the AP 130, and memory 208, 308, each of which is communicatively coupled to one another via a local interface 210, 310. The processor 202, 302 can be any custom made or commercially available processor, a central processing unit (CPU), an auxiliary processor among several processors, a semiconductor-based microprocessor (in the form of a microchip or chip set), an application specific integrated circuit (ASIC), a field programmable gate array (FPGA), or generally any device for executing software instructions. When the AP 110, 130 is in operation, the processor 202, 302 is configured to execute software stored within the memory 208, 308, to communicate data to and from the memory, and to generally control operations of the AP 110, 130 pursuant to the software instructions. For the AP 110, the processor 202 can be configured to perform functionality related to providing IEEE 802.11 access to the devices 150. For the AP 130, the processor 302 can be configured to perform functionality related to providing IEEE 802.15.7 or VLC access to the devices 150.

The network interface 204, 304 is used to enable the AP 110, 130 to communicate on a network, such to the controller 120. The network interface 204, 304 can include, for example, an Ethernet card (e.g., 10BaseT, Fast Ethernet, Gigabit Ethernet), a wireless local area network (WLAN) card (e.g., 802.11a/b/g/n or proprietary wireless protocol based mesh network), or the like. The network interface 204, 304 can include address, control, and/or data connections to enable appropriate communications on the network. The memory 208, 308 is used to store data, such as configuration data, operating instructions, and the like. The memory 208, 308 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 208, 308 can incorporate electronic, magnetic, optical, and/or other types of storage media. Note that the memory 208, 308 can have a distributed architecture, where various components are situated remotely from one another, but can be accessed by the processor 202, 302.

The AP 110 can include one or more of the radio 206 which are configured to receive and transmit wireless signals according to a predetermined protocol such as a variant of IEEE 802.11. The radio 206 includes an antenna interfacing wireless signals with the devices 150 and Radio Frequency (RF) components to modulate/demodulate the wireless signals. The AP 130 can include one or more of the LEDs 306 which are configured to receive and transmit visible light according to a predetermined protocol such as a variant of IEEE 802.15.7 or other VLC protocol. The LEDs 306 include light emitting elements which transmit modulated data on visible light and light sensing elements which receive modulate data on visible light. In an exemplary embodiment, the LEDs 306 include one or more modulated LED lighting fixtures which are used as transmitters and one or more photo/optical sensors which are used as receivers. In this manner, the APs 130 can work both as a lighting source and as an infrastructure data communications device. Specifically, it is expected that the APs 130 will either replace existing lighting sources and/or be used in new construction.

The local interface 210, 310 can be, for example but not limited to, one or more buses or other wired or wireless connections, as is known in the art. The local interface 210, 310 can have additional elements, which are omitted for simplicity, such as controllers, buffers (caches), drivers, repeaters, and receivers, among many others, to enable communications. Further, the local interface 210, 310 can include address, control, and/or data connections to enable appropriate communications among the aforementioned components.

Figure 4:
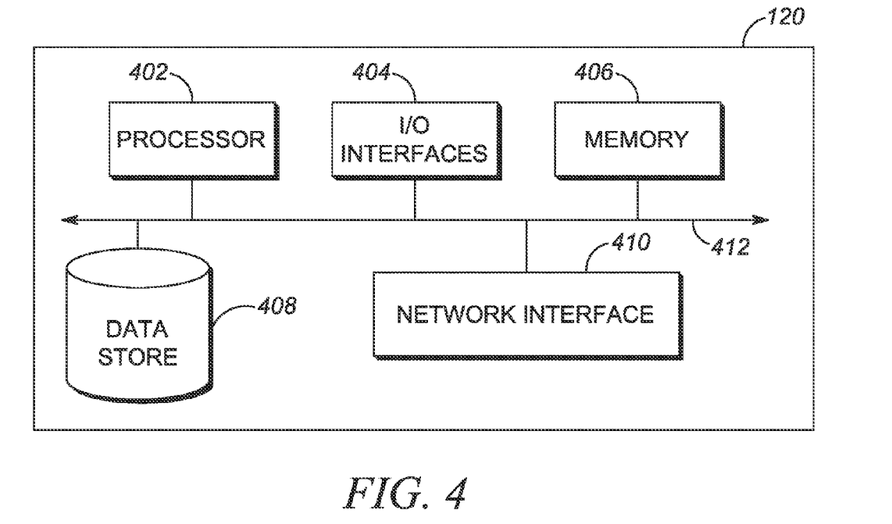
FIG. 4 is a block diagram of an implementation of a controller for the network of FIG. 1 in accordance with some embodiments.

Referring to FIG. 4, in an exemplary embodiment, a block diagram illustrates an implementation of the controller 120. The controller 120 can be a digital computer that, in terms of hardware architecture, generally includes a processor 402, input/output (I/O) interfaces 404, memory 406, a data store 408, and network interfaces 410. The components 402, 404, 406, 408, 410 are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 can include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the controller 120, a semiconductor-based microprocessor (in the form of a microchip or chip set), or generally any device for executing software instructions. When the controller 120 is in operation, the processor 402 is configured to execute software stored within the memory 406, to communicate data to and from the memory 406, and to generally control operations of the controller 120 pursuant to the software instructions. The I/O interfaces 404 can be used to receive user input from and/or for providing system output to one or more devices or components. User input can be provided via, for example, a keyboard and/or a mouse. System output can be provided via a display device and a printer (not shown). I/O interfaces 404 can include, for example, a serial port, a parallel port, a small computer system interface (SCSI), an infrared (IR) interface, a radio frequency (RF) interface, and/or a universal serial bus (USB) interface.

The memory 406 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 406 can incorporate electronic, magnetic, optical, and/or other types of storage media. Note that the memory 406 can have a distributed architecture, where various components are situated remotely from one another, but can be accessed by the processor 402. Software in the memory 406 can include one or more software programs, each of which includes an ordered listing of executable instructions for implementing logical functions, such as an operating system. The operating system essentially controls the execution of other computer programs, provides scheduling, input-output control, file and data management, memory management, and communication control and related services.

The data store 408 can be used to data. The data store can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the data store can incorporate electronic, magnetic, optical, and/or other types of storage media. In one example, the data store 408 can be located internal to the controller 120 such as, for example, an internal hard drive connected to the local interface 412 in the controller 120. Additionally in another embodiment, a data store 408 can be located external to the controller 120 such as, for example, an external hard drive connected to the I/O interfaces 404 (e.g., SCSI or USB connection). Finally in a third embodiment, a data store 408 may be connected to the controller 120 through a network, such as, for example, a network attached file server or the like.

The network interfaces 410 can be used to enable the controller 120 to communicate on a network. The network interfaces 410 can include, for example, an Ethernet card (e.g., 10BaseT, Fast Ethernet, Gigabit Ethernet) or a wireless local area network (WLAN) card (e.g., 802.11a/b/g). The network interfaces 410 can include address, control, and/or data connections to enable appropriate communications on the network. For the controller 120, the network interfaces 410 are utilized to communicate with the APs 110, 130, other controllers 120, external devices, and the like.

In an exemplary embodiment, the APs 130 can be "thin" devices. The thin APs are referred to as "thin" because the associated devices on the thin APs do minimal frame processing. Instead, the thin APs simply behave as a wireless antenna port or light reception/transmission port, forwarding received frames to controller 120 over the network interface 204, 304. In another exemplary embodiment, the APs 130 can do full processing and forwarding of frames relying on the controller 120 for management and configuration. Of course, a combination of both approaches is contemplated herein. In an exemplary embodiment, the LiFi APs 130 can be similar to the WiFi APs 110. Note, in the VLC controller and AP systems and methods, the controller 120 is denoted as a VLC controller. Additionally, the controller 120 can also operate as a WLAN controller controlling both the APs 110, 130 from a single device.

In another exemplary embodiment, one of the APs 110, 130 can include sufficient processing power to act as a virtualized controller thereby eliminating the need for the controller 120 while providing similar functions. The virtualized controller is communicatively coupled to other APs 110, 130 for providing the systems and methods described herein. As is described herein, reference to a controller can include the controller 120 and/or a virtualized controller via one of the APs 110. In an exemplary embodiment, the controller 120 can be integrated in a single device controlling both types of the APs 110, 130 concurrently. In another exemplary embodiment, the controller 120 can be integrated in a single AP 130 controlling other APs 130. Alternatively, the controller 120 can be multiple devices interconnected therebetween and operating in a coordinated manner.

In various exemplary embodiments, VLC controller and AP systems and methods seek to provide "thin" LiFi APs 130 in conjunction with the VLC controller 120 and/or virtualized controller. It is expected that the thin APs 130 will have reduced cost, space, power, etc. and enable wider deployment of VLC technologies. In this context, the VLC controller and AP systems and methods include a splitting of Media Access Control (MAC) functionality in the VLC domain as specified in IEEE 802.15.7 by including a low computational capacity LiFi port on the APs 130 and a high computational capacity LiFi controller 120 communicatively coupled thereto. This is expected to significantly reduce the cost and complexity of the LiFi APs 130 at the same time enabling high throughput LiFi communications through the high capacity LiFi controller 120. There are added benefits of seamless mobility of the mobile devices 150 since there is a centralized device, the controller 120, viewing all of the mobile devices 150 across various LiFi APs 130.

Figure 5:
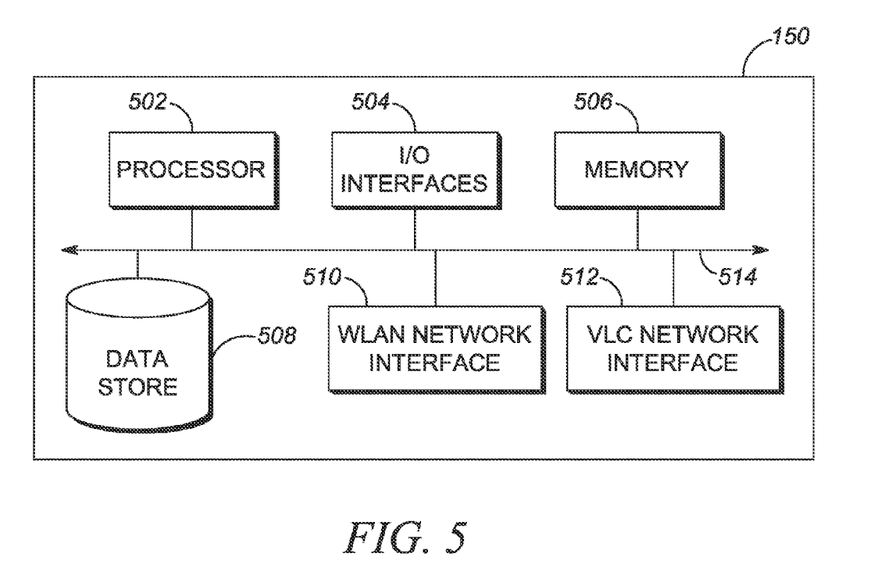
FIG. 5 is a block diagram of an implementation of a device for the network of FIG. 1 in accordance with some embodiments.

Referring to FIG. 5, in an exemplary embodiment, a block diagram illustrates an implementation of one of the devices 150. The device 150 can be a digital computer that, in terms of hardware architecture, generally includes a processor 502, input/output (I/O) interfaces 504, memory 506, a data store 508, a WLAN network interface 510, and a VLC network interface 512. The components 502, 504, 506, 508, 510, 512 are communicatively coupled via a local interface 514. The local interface 514 can be, for example but not limited to, one or more buses or other wired or wireless connections, as is known in the art. The local interface 514 can have additional elements, which are omitted for simplicity, such as controllers, buffers (caches), drivers, repeaters, and receivers, among many others, to enable communications. Further, the local interface 514 can include address, control, and/or data connections to enable appropriate communications among the aforementioned components.

The processor 502 is a hardware device for executing software instructions. The processor 502 can be any custom made or commercially available processor, a central processing unit (CPU), an auxiliary processor among several processors associated with the device 150, a semiconductor-based microprocessor (in the form of a microchip or chip set), or generally any device for executing software instructions. Optionally, the processor 502 can include a mobile optimized architecture. When the device 150 is in operation, the processor 502 is configured to execute software stored within the memory 506, to communicate data to and from the memory 506, and to generally control operations of the device 150 pursuant to the software instructions. The I/O interfaces 504 can be used to receive user input from and/or for providing system output to one or more devices or components. User input can be provided via, for example, a touch screen. System output can be provided via a display device. I/O interfaces 504 can include, for example, a serial port, a parallel port, a small computer system interface (SCSI), an infrared (IR) interface, a radio frequency (RF) interface, a Bluetooth interface, and/or a universal serial bus (USB) interface.

The memory 506 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 506 can incorporate electronic, magnetic, optical, and/or other types of storage media. Note that the memory 506 can have a distributed architecture, where various components are situated remotely from one another, but can be accessed by the processor 502. Software in the memory 506 can include one or more software programs, each of which includes an ordered listing of executable instructions for implementing logical functions, such as an operating system. The operating system essentially controls the execution of other computer programs, provides scheduling, input-output control, file and data management, memory management, and communication control and related services.

The data store 508 can be used to data. The data store can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the data store can incorporate electronic, magnetic, optical, and/or other types of storage media. The WLAN network interface 510 can be used to enable the device 150 to communicate with the APs 110. The WLAN network interface 510 can include, for example, a WLAN card (e.g., 802.11a/b/g). The VLC network interface 512 can be used to enable the device 150 to communicate with the APs 130. The network interfaces 510, 512 can include address, control, and/or data connections to enable appropriate communications on the network. Further, the network interfaces 510, 512 can include software drivers and configurations such that the controller 120 can recognize the device 150 operating via the APs 110, 130.

In an exemplary embodiment, the network 100 includes interworking systems and methods between the APs 110, 130 and the controller 120 to leverage VLC connectivity to offload WLAN connectivity as appropriate. There is substantial potential for VLC/LiFi and WLAN/WiFi technologies to work together to offer better/enormous amounts of wireless bandwidth for end users to solve the bandwidth problem described herein at the same time providing seamless mobility of a device between both domains. VLC/VPAN is well suited for Fixed Wireless Access where one of the devices 150 is mostly stationary. It can work for mobile wireless access as well but not as efficient as WLAN as VLC/VPAN requires visibility between the communicating end points to be present. WIFI/WLAN is well suited for both stationary as well as mobile wireless access. The interworking systems and methods leverage unified control by the controller 120 and/or the virtualized controller to offer VLC/LiFi access to offload WLAN/WiFi access.

Figure 6:
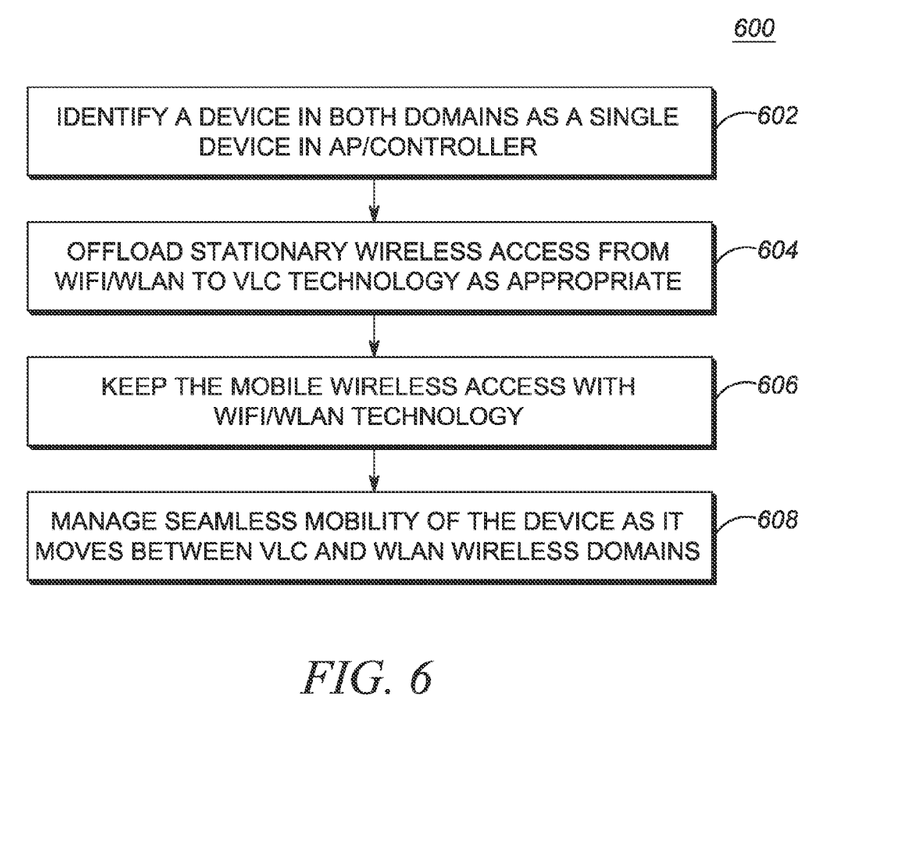
FIG. 6 is a flowchart illustrates a WLAN/WiFi and VLC/LiFi interworking method in accordance with some embodiments.

Referring to FIG. 6, in an exemplary embodiment, a flowchart illustrates a WLAN/WiFi and VLC/LiFi interworking method 600. The interworking method 600 can operate on the controller 120 and/or the virtualized controller in the network 100. First, the interworking method 600 identifies a device, i.e. one of the devices 150, in both the WLAN/WiFi domain and the VLC/LiFi domain as a single device in the controller 120 and/or the virtualized controller (step 602). The interworking method 600 includes offloading stationary wireless access from the WLAN/WiFi domain to the VLC/LiFi domain as appropriate (step 604). Here, the objective is not to offload all WLAN/WiFi traffic, but as much as possible. The interworking method 600 keeps mobile wireless access with the WLAN/WiFi technology even when broadcasting primarily in the VLC/LiFi domain (step 606). Finally, the interworking method 600 manages seamlessly mobility of the device as it moves between the WLAN/WiFi domain and the VLC/LiFi domain (step 608).

Of note, the interworking method 600 tracks each of the devices 150 as a single device in both of the domains. Specifically, a particular device 150 can access either of the APs 110, 130, but from the perspective of the controller 120 and/or the virtualized controller, the device 150 is seen as a single, unified device. As such, the device 150 can seamlessly switch between the domains without traffic interruption. This is important especially for real-time traffic streams and the like. The interworking method 600 contemplates two interworking approaches which are discussed as follows.

In a first interworking approach, IEEE 802.15.7/VPAN has a mode for point-to-multi-point communications where the AP 130 works in beacon or non-beacon mode to enable multiple devices to communicate with it. The AP 130 can provide uplink wired access to the devices 150 communicating with it through VLC. In this approach, the controller 120 and/or the virtualized controller can be a wireless access controller that is enhanced to adopt, manage and control the APs 130. Note, conventional wireless access controllers only support the WLAN APs 110. IEEE 802.11 works with Media Access Control (MAC) addresses which are 48 bits in length similar to the IEEE 802.3 Ethernet standard. Here, Source and Destination MAC addresses are used by end points to communicate with each other.

IEEE 802.15.7 works with VPAN addresses which include two types: 64 bit length long addresses and 16 bit short address. In this approach, a VLC driver on the device 150, such as operating with the VLC network interface 512, is configured to work with the 64 bit long addresses. The VLC driver is enhanced herein to choose the 64 bit address for itself as below <16 short address+48 bits of WLAN interface MAC Address>

The above combination can be in any order, for example, most significant bit (MSB) 16 bits short address and least significant bit (LSB) 48 bits of WLAN MAC, MSB 48 bits of WLAN MAC and LSB 16 bits short address, or 48 bit WLAN MAC embedded anywhere in the 64 bit address space with the rest of 16 bits being the short address. Thus, this approach uses the 16 bit short address for VLC plus the 48 bit WLAN address for identifying the device 150.

With the above approach, two levels of addressing are achieved with a single 64 bit address, i.e. the 16 bit short address is used to identify VPAN end points and the remaining 48 bit WLAN MAC address is used or identify a WLAN end point. With this addressing scheme, the controller 120 and/or the virtualized controller can track the device 150 whenever it connects to either of the APs 110, 130 or both simultaneously, i.e., the controller 120 and/or the virtualized controller knows that it is the same device 150 in both domains. The controller 120 and/or the virtualized controller can also construct a table of <16-bit-VPAN-short-address to 48-bit-MAC-address mappings>. Thus, the VPAN interface on the VLC network interface 512 appears like a logical IEEE 802.3 Ethernet interface on the device 150 just like the WLAN network interface 510.

Whenever the device 150 wants to transmit data over VPAN to the APs 130, the device 150 just sends an IEEE 802.3 frame having the following packet format to the VPAN logical interface:

[48-bit-MAC-destination, 48-bit-MAC-source+
802.1Q tag (optional)+EtherType (Ethernet II)
or length (IEEE 802.3)+Payload+Frame check
sequence (32 bit CRC)].

The VLC driver in the device 150 changes the above IEEE 802.3 frame below to send to its coordinator/VPAN Access Point over VLC to be sent to the destination identified by 48-bit-MAC-destination:

[16_bit_VPAN_COORDINATOR_Address+48-bit-
MAC-destination, 16_bit_mobile_device_
short_VPAN_Address+48-bit-MAC-source,
LLC/SNAP header containing 802.1Q tag (op-
tional)+EtherType (Ethernet II) or length (IEEE
802.3), other header fields in VPAN frame as
documented in the standard].

The VPAN Coordinator which is the controller 120, on receiving the VLC frame above, reconstructs the original IEEE 802.3 frame and bridges it like a regular IEEE 802.3 frame. The reply packet undergoes similar transformations in the opposite direction (the AP 130 constructs the VLC frame and the device 150 reconstructs the IEEE 802.3 frame from the VLC frame). For this, the VPAN AP uses the table of <16-bit-VPAN-short-address to 48-bit-MAC-address mappings table constructed by the controller 120 and/or the virtualized controller to find out which VPAN short address to use for a given MAC address.

For step 604, when both WiFi and LiFi are available, the method 600 can use any one or combination of various factors for choosing which physical link (WiFi or LiFi). The various factors can include, without limitation, based on the traffic flow type; based on WiFi; based on the WiFi Received Signal Strength Indication (RSSI), light signal strength; based on location; based on the remaining power level in the device's 150 battery/power source (battery/AC powered); and the like.

The device's 150 software can be modified to take the same approach for traffic that originates from itself This requires driver code modifications or introduction of a logical interface with its own software that uses either LiFi or WiFi based on the kind of criteria described above. With respect to mobility of the device 150, LiFi/WiFi device movement can be detected by WiFi RSSI and light signal strength measurement and reporting. The LiFi/WiFi AP 110, 130 which receives the measurement report can determine the device movement and its speed and direction. At this point, the controller 120 and/or the virtualized controller become a WiFi+Optical Access Controller.

In a second interworking approach, entire IEEE 802.3 frames can be tunneled in VLC frames. Here, the VLC driver could use either short addresses or long addresses. Use of long addresses decreases the throughput that can be achieved through VLC. Use of short addresses while tunneling the IEEE 802.3 frames should give equivalent throughout as the first approach as the decreased address size compensates for the tunneling overhead. Again, the VLC interface appears as a logical Ethernet interface on the device 150 and uses the WiFi interfaces MAC address as its logical MAC. The controller 120 and/or the virtualized controller construct a table of <16-bit-VPAN-short-address to 48-bit-MAC-address mapping> in this case as well.

The interworking method 600 contemplates various schemes for mobility management between the VLC and WLAN Domains. Various approaches can include using LiFi for both upstream-and-downstream or downstream traffic alone where upstream continues to flow over WiFi. For example, all traffic from client to server can go on WiFi from the device 150 to the AP 110, while all traffic from server-to-client which is majority of the data transferred in case of Web flows go over LiFi from the AP 130 to the device 150. This can provide significant relief to WiFi spectrum as it drastically reduces traffic over WiFi. To prevent loops in the network 100, broadcast/multicast traffic is sent to the device 150 using only either WiFi or LiFi and the device 150 does not bridge broadcast/multicast traffic over to the other interface.

Once the device 150 connects with both the APs 110, 130 according to procedures described above in the two interworking approaches, the controller 120 and/or the virtualized controller know the device's 150 identity in both domains. Using this information, the controller 120 and/or the virtualized controller can provide a mixed mode of operation as described herein in the use cases of the VLC/LiFi technology providing upstream access using WiFi and downstream using VLC/LiFi. i.e., the device 150 connects to the AP 110, 130 using both WiFi and LiFi while it is stationary (like when it is placed on a table). The device 150 uses WiFi to send traffic upstream, but can receive downstream traffic over LiFi. The controller 120 and/or the virtualized controller help achieve this goal by knowing about the fact that the device 150 is connected to itself through both WiFi and LiFi, it transmits all downstream traffic through LiFi via the APs 130.

It can easily happen that while download is in progress, a user of the device 150 moves away from the LiFi AP 130 (e.g., the user wants to move to a conference room to attend a meeting). The AP 130 can detect this movement as soon as the device's 150 connection to the AP's 130 transmitter breaks or is has decreased light detection, and immediately start sending the downstream traffic through WiFi via the AP 110. This helps in preventing the download from breaking/stopping because of LiFi connection teardown. It is also possible that, while the device 150 is stationary it uses LiFi itself for both upstream and downstream traffic while just keeping its WiFi connection intact as a backup. In this case as well, as soon as the LiFi connection breaks the AP 110 starts sending traffic down WiFi. Similarly, the device 150 also switches to using WiFi to send data upstream immediately.

Figure 7:
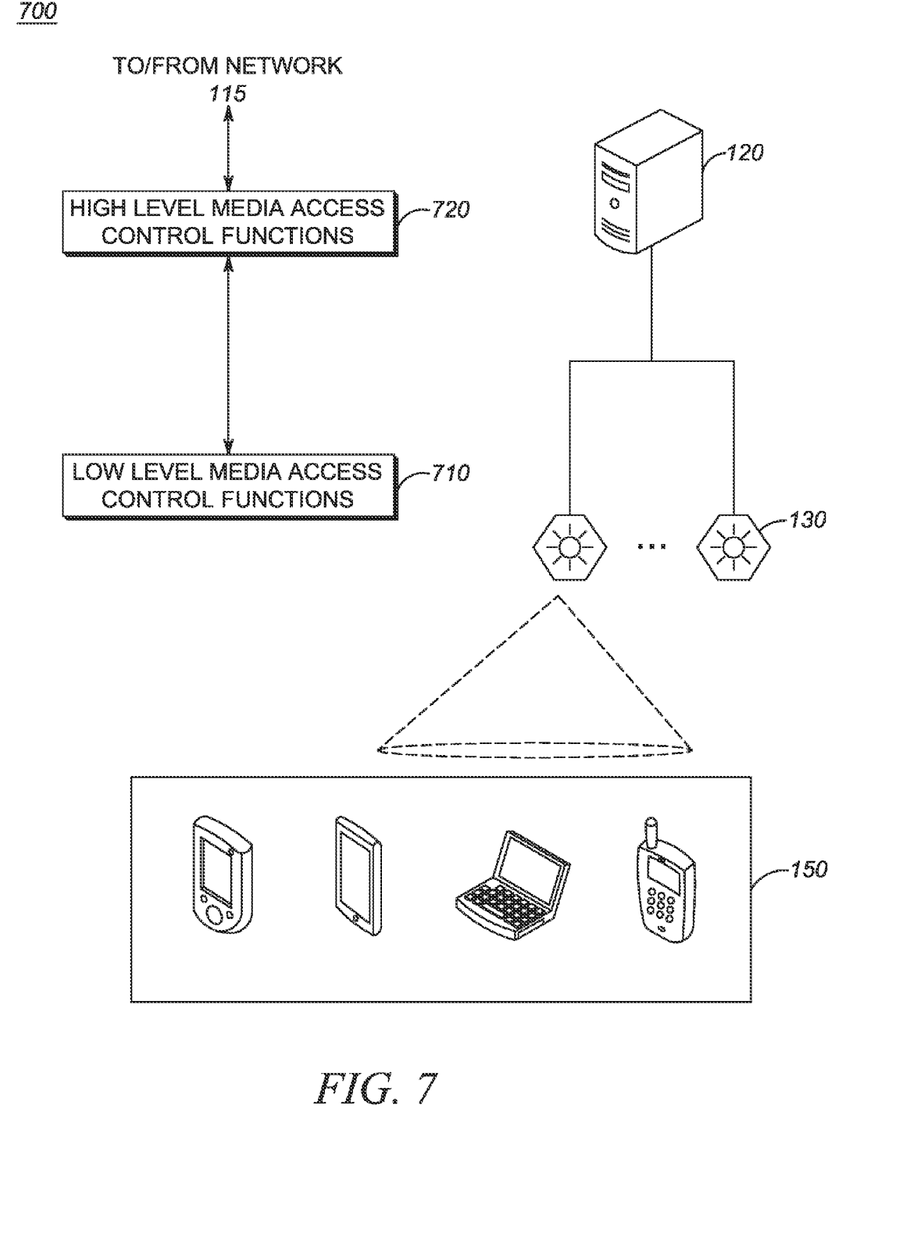
FIG. 7 is a network diagram illustrates a portion of the network 100 showing functionality between a VLC controller and LiFi APs in accordance with some embodiments.

Referring to FIG. 7, in an exemplary embodiment, a network diagram illustrates a portion of the network 100 showing functionality between the VLC controller 120 and the APs 130. As described herein, the APs 130 are so-called thin APs which include reduced processing components by sharing processing with the VLC controller 120. In this manner, processing of frames to/from the APs 130 are performed cooperatively with the VLC controller 120. Specifically, a frame received from one of the mobile devices 150 undergoes low level processing 710 in the receiving AP 130 which forwards the low level processed frame to the VLC controller 120. The low level processed frame undergoes high level processing 720 in the VLC controller 120 and resultant data is sent to the network 115. Conversely, data from the network 115 undergoes the high level processing 720 in the VLC controller 120 which sends a high level processed frame to the AP 130. The AP 130 performs the low level processing 710 on the high level processed frame and sends the resultant data or frame to the mobile device 150.

In this manner, the AP 130 can be described as having a low level processing port and the VLC controller 120 can be described as having a high level processing port. By removing processing functionality from the APs 130, these devices can have lower cost, size, power, etc. making it easier from a form-factor perspective for the APs 130 to replace conventional lighting sources. This is expected to encourage deployment of the APs 130 in lieu of conventional lighting sources.

Exemplary VLC media access control (MAC) functions performed by the VLC controller 120 and/or the APs 130 can include, without limitation, a channel access function, beacon generation, a cyclic redundancy check function, a header generation/parsing function, an acknowledgment (ACK) parsing/generating function, a collision avoidance function, a retransmission timeout function, a fast link recover function, a mobility and roaming function, a retransmission function, a host interface function, association and disassociation, authentication and encryption of data traffic, guaranteed time slot (GTS) allocation and management, Visibility and dimming support, and the like.

In various exemplary embodiments, these VLC MAC functions can be split between the VLC controller 120 (or virtualized controller) and the AP 130. Those of ordinary skill in the art will recognize any possible split can occur. Specifically, the VLC MAC functions can be classified as LiFi port functions which can be low level MAC functions performed by the AP 130 and as LiFi access controller functions which are high level MAC functions performed by the controller 120 or the virtualized controller. In an exemplary embodiment, a possible split of the VLC MAC functions between the AP 130 and the VLC controller 120 or virtualized controller can include:

| LiFi-Port Functions: |
| --- |
| low level media access control functions such as channel access function |
| low level media access control functions such as beacon generation |
| low level media access control functions such as cyclic redundancy check function |
| low level media access control functions such as header generation/parsing function |
| low level media access control functions such as ACK parsing/generating function |
| low level media access control functions such as collision avoidance function |
| low level media access control functions such as retransmission timeout function |
| low level media access control functions such as fast link recovery |

| LiFi Access Controller Functions: |
| --- |
| high level media access control functions such as mobility and roaming function |
| high level media access control functions such as a retransmission function |
| high level media access control functions such as a host interface function |
| high level media access control functions such as association and disassociation |
| high level media access control functions such as authentication and encryption of data traffic |
| high level media access control functions such as GTS allocation and management |
| high level media access control functions such as Visibility and dimming support |

Each of the aforementioned VLC MAC functions is now described. The channel access function enables communication over the physical light frequencies, i.e. mechanisms for accessing the physical optical channel. This includes framing functionality in a single VLC MAC frame that can be one of multiple modes. This can also include a contention access period (CAP), a contention-free period (CFP), monitoring channel usage for determining availability, and implementing a random access algorithm based on the CFP and/or the CAP. In an exemplary embodiment, channel access is performed at the APs 130.

Beacon generation involves periodically generating and transmitting beacon frames over the physical optical channel to announce the presence of the AP 130 for connectivity thereto. In an exemplary embodiment, beacon generation and transmission is performed by the APs 130. The cyclic redundancy check (CRC) function is performed using CRC data included in a MAC frame and a physical layer (PHY) header to verify the validity of received data. For example, IEEE 802.15.7 describes an exemplary CRC in Annex C. In an exemplary embodiment, the CRC function is performed by the APs 130.

The header generation/parsing function includes generating and parsing PHY and/or MAC headers and the like. In an exemplary embodiment, the header generation/parsing function is performed by the APs 130. The ACK parsing/generating function includes parsing and generating the acknowledgment request subfields in MAC or data frames. In an exemplary embodiment, the header generation/parsing function is performed by the APs 130. The collision avoidance function relates to the channel access function and includes sensing channel activity and, if the channel is busy, backing off for a random number of time slots before trying to access the channel again. In an exemplary embodiment, the collision avoidance function is performed by the APs 130.

The retransmission timeout function relates to retransmission of frames from the AP 130 to a device 150. In an exemplary embodiment, the retransmission timeout function is performed by the APs 130 with the devices 150. The fast link recover function relates to link recovery procedures. If a timer expires before a fast link recovery response is received, a device assumes the link is broken and cannot be recovered. In an exemplary embodiment, the fast link recover function is performed by the APs 130 with the devices 150.

The mobility and roaming function includes link switching due to physical movement or interference. In VLC, mobility can have two types: physical which involves a device 150 physically changing position due to movement with a coverage area of the APs 130 and logical where the device 150 changes its communication link between the APs 130 due to interference, deliberate channel switching, etc. In an exemplary embodiment, the mobility and roaming function can be performed by the controller 120 or the virtualized controller based on its centralized view of the APs 130.

The retransmission function relates to retransmitting frames based on lack of acknowledgments. In an exemplary embodiment, the retransmission function can be performed by the controller 120 or the virtualized controller. The host interface function includes processing data frames for interfacing with the network 115. In an exemplary embodiment, the host interface function can be performed by the controller 120 or the virtualized controller. Association and disassociation relates to maintain VLC links with the mobile devices 150. This includes sending and receiving association and disassociation requests and responses. In an exemplary embodiment, the association and disassociation can be performed by the controller 120 or the virtualized controller based on its centralized view of the APs 130.

Authentication and encryption of data traffic relates to security functions in IEEE 802.15.7. For example, this can include parameters for CCM* (Counter with cipher block chaining message authentication code (CBC-MAC)) security operations, as specified in Annex A of IEEE Std 802.15.4-2006, the contents of which are incorporated by reference herein. In an exemplary embodiment, authentication and encryption of data traffic can be performed by the controller 120 or the virtualized controller. GTS allocation and management relates to allowing a device 150 to operate on the channel within a portion of a superframe that is dedicated (on the VPAN) exclusively to that device. In an exemplary embodiment, GTS allocation and management can be performed by the controller 120 or the virtualized controller.

Visibility and dimming support relates to alignment (device discovery, negotiation, connection), visible guiding for user alignment, infrastructure continuous light output, blinking for unexpected interference, disconnection warnings, and the like. In an exemplary embodiment, visibility and dimming support can be performed by the controller 120 or the virtualized controller.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network, comprising:
   at least one visible light access point communicatively coupled to a device via a light connection;
   a controller communicatively coupled to the at least one visible light access point and an external network;
   the at least one visible light access point is configured to perform a first set of media access control functions; and
   the controller is configured to perform a second set of media access control functions, wherein the controller and the at least one visible light access point cooperatively perform the first set of media access control functions and the second set of media access control functions associated with frames between the device.

2. The network of claim 1, wherein the controller comprises a standalone device communicatively coupled to the at least one visible light access point.

3. The network of claim 1, wherein the controller comprises a virtualized controller operating within one of the at least one visible light access point.

4. The network of claim 1, further comprising:
   at least one wireless access point communicatively coupled to the controller;
   wherein the controller is configured to control both the at least one wireless access point and the at least one visible light access point.

5. The network of claim 4, wherein the at least one wireless access point is configured to perform a third set of media access control functions for a wireless connection; and
   wherein the controller is configured to perform a fourth set of media access control functions, wherein the controller and the at least one wireless access point cooperatively perform the third set of media access control functions and the fourth set of media access control functions associated with frames for the wireless connection.

6. The network of claim 1, wherein the first set of media access control functions comprise low level media access control functions and the second set of media access control functions comprise high level media access control functions.

7. The network of claim 6, wherein the low level media access control functions are associated with channel access in a protocol associated with the light connection and the high level media access control functions are associated with frame and protocol processing in the protocol associated with the light connection.

8. The network of claim 6, wherein the low level media access control functions comprise any of:
   a channel access function;
   beacon generation;
   a cyclic redundancy check function;
   a header generation/parsing function;
   an acknowledgment (ACK) parsing/generating function;
   a collision avoidance function;
   a retransmission timeout function; and
   a fast link recover function; and
   wherein the high level media access control functions comprise any of:
   a mobility and roaming function;
   a retransmission function;
   a host interface function;
   association and disassociation;
   authentication and encryption of data traffic;
   guaranteed time slot (GTS) allocation and management; and
   visibility and dimming support.

9. The network of claim 4, wherein the controller is configured to seamlessly manage interworking of the device between the light connection and the wireless connection by tracking the device using a single addressing scheme.

10. The network of claim 1, wherein the light connection is compliant to IEEE 802.15.7-2011.

11. A controller, comprising:
    a network interface communicatively coupled to a Visible Light Communications (VLC) access point and a network;
    a processor; and memory storing instructions that, when executed, cause the processor to:
receive a first partially processed data frame from the VLC access point, wherein the first partially processed data frame is directed from a device to the network, and wherein the first partially processed data frame has been processed according to a first set of media access control functions by the VLC access point;
perform a second set of media access control functions on the first partially processed data frame, wherein the controller and the at least one visible light access point cooperatively perform the first set of media access control functions and the second set of media access control functions associated with frames between the device;
partially process a second data frame according to the second set of media access control functions, wherein the second data frame is directed from the network to the device; and
transmit the second partially processed data frame to the VLC access point for subsequent processing of the second partially processed data according to the first set of media access control functions by the VLC access point.

12. The controller of claim 11, wherein the controller comprises a standalone device communicatively coupled to the VLC access point.

13. The controller of claim 11, wherein the controller comprises a virtualized controller operating within the VLC access point.

14. The controller of claim 11, wherein the instructions that, when executed, further cause the processor to:
receive a third partially processed data frame from a wireless access point, wherein the third partially processed data frame is directed from a device to the network, and wherein the third partially processed data frame has been processed according to a third set of media access control functions by the wireless access point;
perform a fourth set of media access control functions on the third partially processed data frame, wherein the controller and the wireless access point cooperatively perform the third set of media access control functions and the fourth set of media access control functions associated with frames between the device;
partially process a fourth data frame according to the fourth set of media access control functions, wherein the fourth data frame is directed from the network to the device; and
transmit the fourth partially processed data frame to the wireless access point for subsequent processing of the fourth partially processed data according to the third set of media access control functions by the wireless access point.

15. The controller of claim 11, wherein the first set of media access control functions comprise low level media access control functions and the second set of media access control functions comprise high level media access control functions.

16. The controller of claim 15, wherein the low level media access control functions are associated with channel access in a protocol associated with the light connection and the high level media access control functions are associated with frame and protocol processing in the protocol associated with the light connection.

17. The controller of claim 15, wherein the low level media access control functions comprise any of:
a channel access function;
beacon generation;
a cyclic redundancy check function;
a header generation/parsing function;
an acknowledgment (ACK) parsing/generating function;
a collision avoidance function;
a retransmission timeout function; and
a fast link recover function; and
wherein the high level media access control functions comprise any of:
a mobility and roaming function;
a retransmission function;
a host interface function;
association and disassociation;
authentication and encryption of data traffic;
guaranteed time slot (GTS) allocation and management; and
visibility and dimming support.

18. The controller of claim 14, wherein the controller is configured to seamlessly manage interworking of the device between the VLC access point and the wireless access point by tracking the device using a single addressing scheme.

19. The controller of claim 11, wherein first set of media access control functions and the second set of media access control functions are in accordance with IEEE 802.15.7-2011.

20. A method, comprising:
receiving a first data frame at a Visible Light Communications (VLC) access point directed from a device to a network;
performing a first set of media access control functions on the first data frame in the VLC access point to provide a first partially processed data frame;
forwarding the first partially processed data frame to a controller;
performing a second set of media access control function on the first partially processed data frame to provide a first fully processed data frame;
forwarding the first fully processed data frame to the network;
receiving a second data frame at the controller directed from the network to the device;
performing the second set of media access control functions on the second data frame in the controller to provide a second partially processed data frame;
forwarding the second partially processed data frame to the VLC access point;
performing the first set of media access control function on the second partially processed data frame to provide a second fully processed data frame; and
forwarding the second fully processed data frame to the device.

* * * * *